A. V. ROE.
SEAT SUPPORT ON AIRCRAFT.
APPLICATION FILED OCT. 31, 1918.
1,350,266.
Patented Aug. 17, 1920.
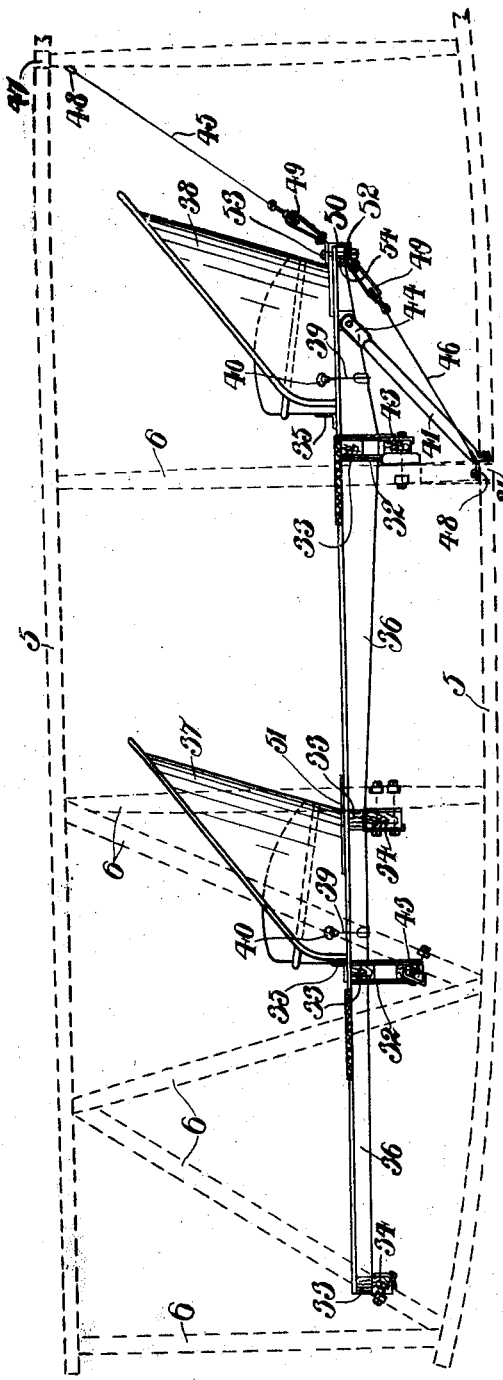
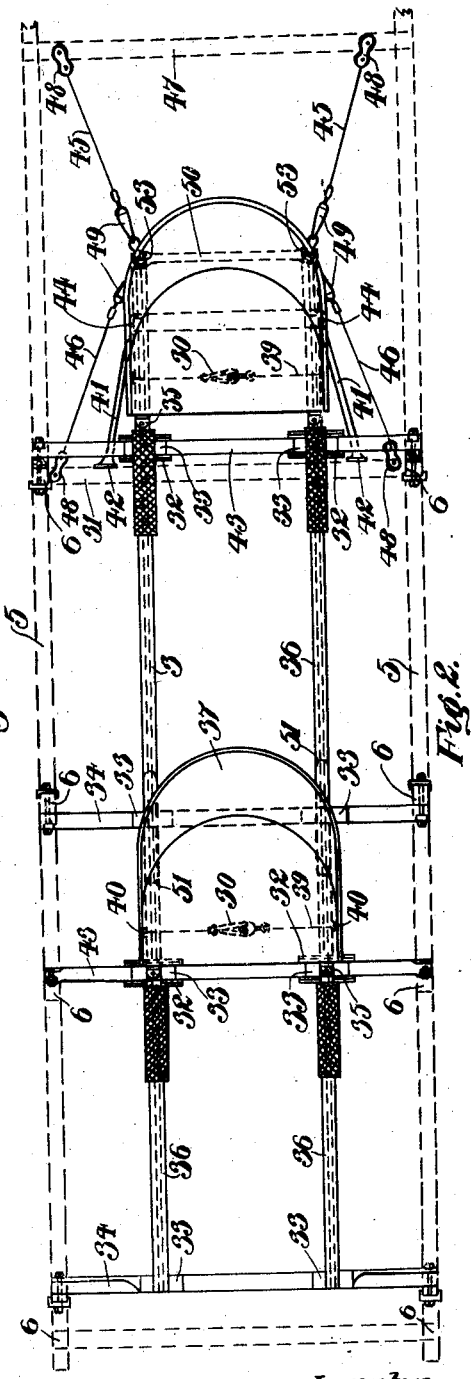
Inventor
A. V. ROE.
BY Eugene C. Brown
Attorney.

UNITED STATES PATENT OFFICE.

ALLIOTT VERDON ROE, OF HAMBLE, SOUTHAMPTON, ENGLAND.

SEAT-SUPPORT ON AIRCRAFT.

1,350,266. Specification of Letters Patent. Patented Aug. 17, 1920.

Application filed October 31, 1918. Serial No. 260,517.

*To all whom it may concern:*

Be it known that I, ALLIOTT VERDON ROE, a subject of the King of Great Britain, residing at Hamble, Southampton, England, have invented certain new and useful Improvements in Seat-Supports on Aircraft, of which the following is a specification.

This invention consists of a structure for supporting a pair of seats in the fuselage of an aeroplane or other aircraft, and the object of the invention is to provide a secure connection between the seats and the fuselage frame.

The accompanying drawings illustrate the method of supporting a pair of seats within the fuselage of an aeroplane.

Figure 1 is a side elevation of the structure supporting the seats as connected with the framework of the fuselage in which they are placed; and Fig. 2 is a plan view of Fig. 1.

Referring to the drawings, 5, 5, are longerons forming part of the fuselage framework, and 34, 34 are cross joists connected with said framework, say, by clips and bolts fixing them to adjoining upright or slanting body-side struts 6 (shown dotted); 43, 43 are cross joists at a lower level, also fixed to adjoining body struts.

Attached to the cross joists 34, 43 through the medium of packing blocks 33 are longitudinal beams 36 extending from the front cross joist 34 to the rearmost cross joist 43 shown in the drawings, and overhung somewhat behind the latter. On the overhanging parts of the beams 36 is placed the seat 38, while the forward seat 37 is fixed above the two intermediate cross joists 34, 43. In the case of the joists 43 at the low level, support plates 32 extend upwardly from said joists to carry packing blocks 33 upon which the beams 36 rest. The beams 36, being preferably of T section, are supported by blocks 33 on each side of the vertical web, which can thus be much deeper at the point of greatest bending moment due to the projecting parts at the rear. The actual seats themselves, viz., 37 and 38, are connected to the beams 36 by means of angle brackets 35 which secure the front of the seat, and further by means of cables 39 which are fixed to the sides of the seat by means of wiring plates 40 and which, passing underneath the beams 36, are each provided with a turnbuckle 30 by which tension may be applied to the cables 39 in order to hold the seats firmly attached to the beams 36.

The front seat 37 is also provided at its rear with metal plates 51, by means of which it is secured to the beams 36, while the rear seat 38 has somewhat similar securing plates 52, but the latter are, at their rear extremities, turned over the rear ends of the beams 36 and pass underneath said beams for a short distance, so that these plates are pierced twice by the bolts 53 securing the wire bracing hereinafter described. Suitable packing blocks 54 are applied to the extremities of the T-section beams in order to provide proper bearing surfaces for the turned over extremities of the plates 52. Since the ends of the beams which support the seat 38 are overhanging, these ends are connected together by a transverse tie 50, and also with the fuselage frame by means of the compression struts 41, diverging somewhat toward their lower connections 42 with the lower frame member 31 (see Fig. 2) and fixed to the sides of the beams 36 by their flattened ends 44; in addition to the struts 41 diverging tension wires 45 connect the ends of the beams 36 with an upper cross frame member 47, being provided with wiring plates 48 and turnbuckles 49 of ordinary character, while additional bracing wires 46 lead downward from the ends of the beams 36 to the frame member 31 forwardly placed in regard to the ends of the beams 36. Similar wiring plates 48 are used to anchor this second pair of bracing wires and similar turnbuckles 49 for tensioning the latter.

These joists and beams constitute a complete seat bearing unit, which is distinct from the fuselage proper and upon which the seats are directly mounted. The method of securing the seats by means of the wire bracing provides a safe and certain connection under all circumstances.

What I claim as new and useful, and desire to secure by Letters Patent, is:—

1. In an aeroplane, the combination with a fuselage having a framework comprising longeron, cross strut and tie members, of a series of transverse joists, a pair of longitudinal beams secured to said joists, a seat, means for attaching the said seat to said beams, a tension wire attached at each side to said seat and passing under said beams, and a tension adjusting member connected in said wire.

2. In an aeroplane, the combination with a fuselage having a framework comprising longeron, cross strut and tie members, of a series of transverse joists, a pair of longitudinal beams secured to said joists and extending backwardly over the rearmost joist, a seat, means for attaching the said seat to said beams at an intermediate position, a second seat disposed on the backwardly projecting portion of said beams, tension wires attached on each side to the said seats and passing under said beams, tension adjusting members connected in the said wires, a pair of struts supporting the backwardly projecting part of the beams, a transverse tie across the backwardly projecting ends of the beams, wiring plates connected with the ends of said beams, a pair of tension wires disposed forwardly and downwardly from the ends of the said transverse tie, a pair of tension wires disposed upwardly and backwardly from the ends of the said transverse tie, tension adjusting devices in the several tension wires, and means for anchoring the other ends of the tension wires to the fuselage framework.

3. In an aeroplane, the combination with a fuselage comprising longeron, cross strut and tie members, of a series of transverse joists, a seat support formed by the overhanging ends of two longitudinal beams, a pair of divergent struts disposed between the overhanging beams and a transverse rail across the base of the fuselage, a tie member across the ends of the overhanging beams provided at each end with wiring plates, wiring plates on the said transverse rail, wiring plates on a rail across the top of the fuselage rearwardly of the overhanging beams, and adjustable divergent tension wires connecting together with wiring plates at the ends of the said tie member and those on the cross rails respectively on each side of the seat support.

4. In an aeroplane, the combination with a fuselage comprising longerons, side struts, and cross struts, of a series of transverse joists, means for securing the joists to adjoining side struts, a pair of longitudinal beams of T-section, packing blocks disposed between the transverse joists and the top flanges of the beams, support plates connecting certain of said blocks with said transverse joists, seats, and means for attaching the said seats to the said beams, all substantially as and for the purpose set forth.

In testimony whereof I affix my signature in the presence of two witnesses.

ALLIOTT VERDON ROE.

Witnesses:
HARVEY J. BAVENTORT,
CHARLES PACK.